Figure 1:
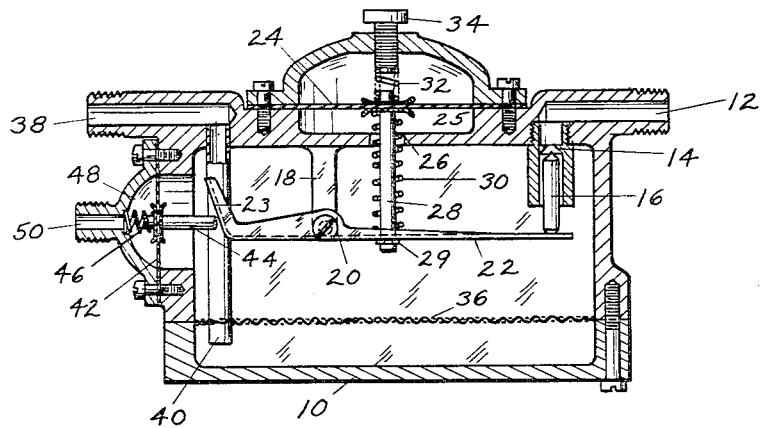

Dec. 18, 1956  E. R. SCHNEIDER  2,774,374
PULSATION SMOOTHING VALVE
Filed Feb. 21, 1951  2 Sheets-Sheet 1

INVENTOR
Edgar R. Schneider
BY
Ray Eilers
ATTORNEY

Dec. 18, 1956   E. R. SCHNEIDER   2,774,374
PULSATION SMOOTHING VALVE

Filed Feb. 21, 1951   2 Sheets-Sheet 2

INVENTOR
Edgar R. Schneider
BY
Ray Eilers
ATTORNEY

2,774,374

PULSATION SMOOTHING VALVE

Edgar R. Schneider, Sullivan, Mo.

Application February 21, 1951, Serial No. 212,158

5 Claims. (Cl. 137—595.29)

This invention relates to improvements in carburetors. More particularly, this invention relates to improvements in pulsation dampeners which can be used with carburetors.

It is therefore an object of the present invention to provide an improved pulsation dampener which can be used with carburetors.

In the operation of many internal combustion engines, fuel is drawn from a fuel tank and forced, by a fuel pump, into the float chamber of a carburetor; and thereafter that fuel will flow, under the influence of gravity, to a jet in the carburetor where the air passing through the carburetor can aspirate that fuel. The float chamber and the jet of the carburetor are usually disposed so a float valve within the float chamber will maintain the fuel level in the float chamber at a level immediately below the opening in the jet; and with such a construction the fuel level in the jet will, when the engine is at rest, be immediately below the opening in the jet. This keeps fuel from issuing from the jet when the engine is at rest but permits ready aspiration of fuel by the air which passes through the carburetor whenever the engine is operating.

Fuel pumps of internal combustion engines are customarily equipped with valved by-passes from their outlets to their inlets, and those by-passes are intended to enable the fuel pumps to maintain a uniform and steady pressure adjacent the float valves in the float chambers of the carburetors for the engines. However, the fuel pumps are usually of the flexible diaphragm type and they are actuated twice during each revolution of the engines' crankshafts; consequently, those fuel pumps create pronounced, periodic pulsations in the pressure on the fuel adjacent the float valves of the float chambers of said carburetors. These pulsations coact with the recurrent openings and closings of the float valves of the float chambers of said carburetors as the engines consume fuel, to cause "jetting" of fuel into the float chambers; and this "jetting" causes appreciable turbulence and sloshing of the fuel within the float chambers. The turbulence and sloshing of the fuel within the float chambers will force the floats in those chambers to move up and down in response to average fuel levels rather than to absolute fuel levels; and since those average fuel levels can be above the normal absolute fuel levels in the float chambers, the float valves can admit fuel into the float chambers at times when the total quantities of fuel within those chambers are great enough to raise the absolute fuel levels above the normal absolute fuel levels. This can raise the absolute fuel levels in the jets to such an extent that fuel can spill out of the jets; causing needless and wasteful enrichment of the fuel-air mixture flowing to the intake manifolds of the engines.

The present invention minimizes pulsations in the fuel pressure, and the difficulties due thereto, by providing a pulsation dampener between the fuel pump and the float chamber of the carburetor of an engine. This pulsation dampener includes a container which has a pressure-responsive valve intermediate the inlet and the outlet of the container; and that valve responds to the pressure on the fuel within the container to permit or prevent the further flow of fuel into said container. The valve is sensitive to even small variations in the pressure on the fuel within the container and will promptly close whenever that pressure tends to rise unduly. Consequently, the pulsation dampener maintains the pressure on the fuel within the container between narrow limits; and as a result fuel flows into, through, and out of the container smoothly and quietly. This enables the fuel within the container to be in a relatively quiescent state; and that fuel can flow smoothly and quietly into the float chamber of the carburetor whenever the float valve of the carburetor is open. The pressure-responsive portion of the pressure-responsive valve will, in responding to pressure variations, tend to absorb and smooth out pressure pulsations; and, in addition, a small cushion of air is maintained adjacent said pressure-responsive portion of said pressure-responsive valve. The conjoint action of the pressure-responsive portion of the pressure-responsive valve and the cushion of air adjacent thereto almost completely eliminates pulsations in the pressure on the fuel; and the resulting substantial freedom from pulsations increases the efficiency of operation of the carburetor and the engine. It is therefore an object of the present invention to provide a pulsation dampener which can be interposed between the fuel pump and the float chamber of the carburetor of an engine to reduce pulsations in the pressure on the fuel entering said float chamber.

The pressure-responsive portion of the pressure-responsive valve of the pulsation dampener provided by the present invention responds, through the medium of the air cushion adjacent thereto, to the pressure on the fuel within the container of said pulsation dampener to move the pressure-responsive valve to closed position. The pressure-responsive valve will be biased to open position by a spring, but the spring will be dimensioned so its force can be overcome by the pressures exerted on the pressure-responsive portion of the pressure-responsive valve; hence the valve will open and close as the pressures on the fuel within the container fluctuate. The force exerted by the spring can be adjusted by an adjusting screw; and thus the pressures that will close the valve can be varied at will. It is therefore an object of the present invention to provide a pulsation dampener with a pressure-responsive valve that is biased to open position by an adjustable spring but which can be moved to closed position by the pressures on the fuel within the container of said pulsation dampener.

The pressures on the fuel within the container of the pulsation dampener will tend to fall whenever the float valve in the float chamber of the carburetor opens and permits fuel to flow from the said container. The pressure-responsive valve in said container will then open and permit additional fuel to enter said container. In all instances with most engines, the rate at which fuel flows to and through the pulsation dampeners will be high enough to more than supply the full needs of those engines. With a few very large engines, there may be instances where the action of the pressure-responsive valve could limit somewhat the fuel supplied to those engines; and therefore the present invention provides an apparatus which can hold the pressure-responsive valve open as the engines approach full throttle operation. For example, the pulsation dampener provided by the present invention can be equipped with a pressure-responsive element that is biased by a spring to act upon the pressure-responsive valve of the pulsation dampener and move that valve to open position. This pressure-responsive element will be in communication with the reduced pressures in the intake manifold of the engine and will normally be enabled by those reduced pressures to resist the biasing action of said spring. Such a pressure-responsive element will, as long as the intake manifold pressures are low, permit the pressure-responsive valve of the pulsation dampener to open and close in response to the pressures on the fuel within the container of that pulsation dampener; but will whenever the intake manifold pressures rise considerably, as they will whenever the engine approaches full throttle operation, act to hold that pressure-responsive valve in open position. Such a pressure-responsive element automatically assures full flow of fuel to the float valve of the carburetor. The pulsation dampener could also be equipped with a push rod that normally permits the pressure-responsive valve to open and close in response to variations in the pressure on the fuel with said container, but which can be moved to hold that valve open; and that push rod can respond to mechanical or electrical actuation that is supplied whenever the engine approaches full throttle operation. Regardless of which of these apparatus is used, the pulsation dampener is enabled to provide unimpeded fuel flow even though the engine approaches full throttle operation. It is therefore an object of the present invention to provide a pulsation dampener with apparatus which will hold the pressure-responsive valve of that pulsation dampener in open position as the engine approaches full throttle operation.

Where desired, the pulsation dampener provided by the present invention can be equipped with a float-operated valve rather than a pressure-responsive valve. The float which operates said valve is equipped with a contilever spring in which resilient energy can be stored as the float moves upwardly. This energy will then urge the fuel into the float chamber of the carburetor whenever the float valve of that chamber opens. In this way, the float and cantilever spring constitute a mechanical counterpart of the pressure-responsive element for which they are substituted.

The pulsation dampener provided by the present invention also serves as a pressure regulator; the spring pressures therein being adjustable to vary the pressures exerted on the fuel within the container. This enables the pulsation dampener to supply fuel under uniform, predetermined pressures in the range from zero pressure to the pressure values attained by the fuel pump.

Other and further objects and advantages of the present invention should become apparent from an examination of the drawing and accompanying description.

In the drawing and accompanying description several preferred embodiments of the present invention have been shown and described but it is to be understood that the drawing and accompanying description are for the purpose of illustration only and do not limit the invention and that the invention will be defined by the appended claims.

Figure 2:
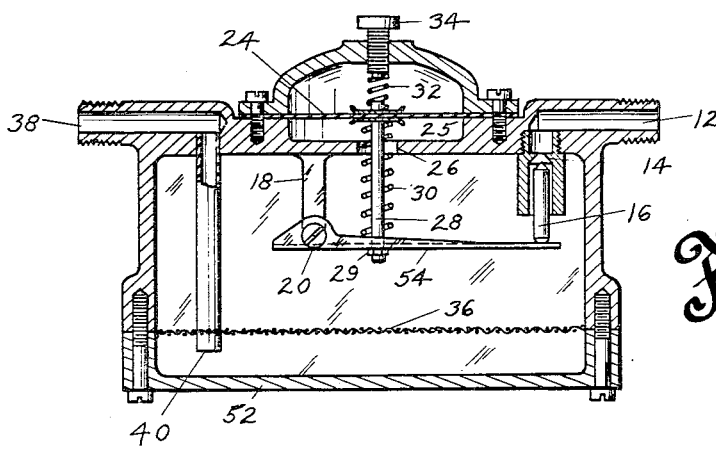
Figure 3:
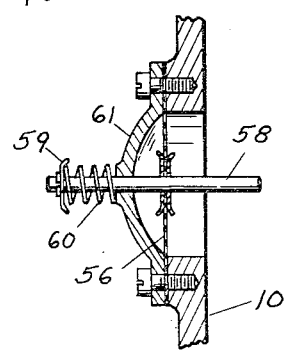
Figure 4:
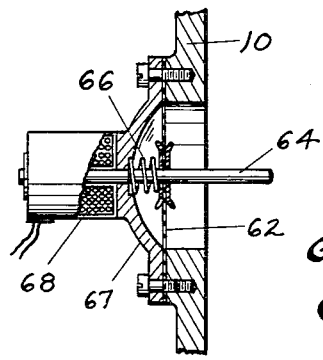
Figure 5:
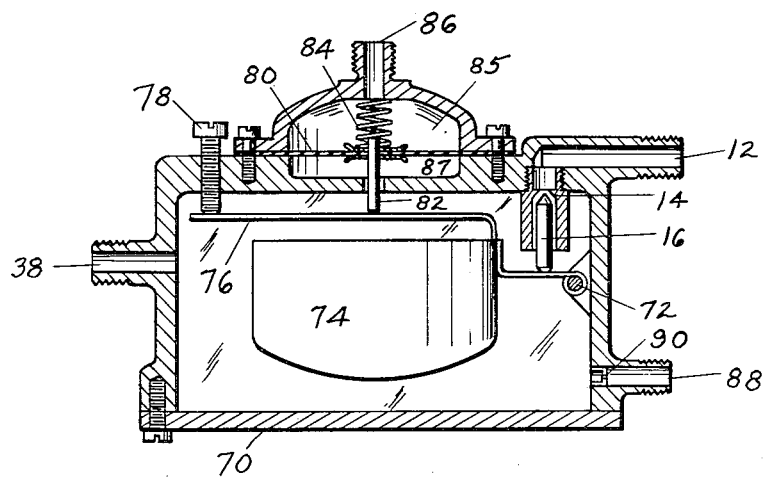

In the drawing, Fig. 1 is a cross-sectional side view of a pulsation-dampener which is made in accordance with the principles and teachings of the present invention, Fig. 2 is a cross-sectional side view of another form of pulsation dampener which is made in accordance with the principles and teachings of the present invention, Fig. 3 is a larger view of a push rod which can be used with the pulsation-dampener of Fig. 1, Fig. 4 is a larger view of another form of push rod which can be used with the pulsation-dampener of Fig. 1, and Fig. 5 is a cross-sectional side view of another form of pulsation-dampener which is made in accordance with the principles and teachings of the present invention.

Referring to the drawing in detail, the numeral 10 denotes the liquid-tight container of a pulsation dampener which can be interposed between the fuel pump and carburetor of an internal combustion engine. An opening 12 is provided adjacent one side of the top of the container 10, and that opening will be placed in communication with the outlet of the fuel pump, not shown. A valve seat 14 is provided adjacent the opening 12, and a valve element 16 is selectively engageable with the valve seat 14 to permit or prevent influx of fuel through opening 12 and seat 14 into the container 10.

A lug 18 is formed on the interior of the container 10, and that lug supports a pivot 20. The pivot rotatably supports a lever 22; and one end of that lever underlies and supports the valve element 16. A pressure-responsive element 24, shown in the form of a diaphragm, is held in the upper portion of the container 10; and an opening is provided in the container 10 to permit pressures within the container 10 to act upon the underside of the pressure-responsive element 24. A recess 25 is formed below the pressure-responsive element, and a cushion of air will be trapped within that recess whenever the pulsation dampener is in the position shown in the drawing and the container 10 thereof is filled with fuel.

A rod 28 is integrally secured to the pressure-responsive element 24, and it will move with that element as that element flexes. The lower end of the rod 28 extends through an opening in the lever 22, and a hairpin-like fastener 29 is secured to the bottom of rod 28. The fastener limits movement of lever 22 downwardly relative to the rod 28. A spring 30 encircles the rod 28 and biases the lever 22 downwardly against fastener 29; the spring 30 and the fastener 29 securing rod 28 and lever 22 together for conjoint movement. A pin joint connection could be used between lever 22 and rod 28, but the spring and fastener connection is preferred since it eliminates all of the "play" encountered in pin joint connections. The lever 22 and the rod 28 engage each other intermediate the pivot 20 and the point where lever 22 engages the valve element 16. Consequently, any movement of lever 22 caused by rod 28 will be multiplied and applied to the valve element 16.

A spring 32 is disposed above the pressure-responsive element 24, and that spring encircles the upper end of rod 28. An adjustable screw 34 extends through the top of the container 10 and has its lower end disposed within the upper end of spring 32 to maintain said screw and spring in register. The screw 34 can be adjusted to vary the pressure exerted by the spring 32 on the pressure-responsive element 24.

A screen 36 is disposed within the container 10, and that screen is intermediate the top and bottom of container 10. A pipe 40 extends downwardly from opening 38, which is at the left hand side of the top of container 10, to a point adjacent the bottom of container 10. This pipe will conduct fuel upwardly from below screen 36 to opening 38. That opening is in communication with the float valve of the carburetor, not shown. Fuel entering container 10 through opening 12 must pass through screen 36 before it can enter pipe 40 and be conducted to outlet opening 38. Consequently, screen 36 can act to separate adulterant materials from the fuel.

A pressure-responsive element 42, shown in the form of a diaphragm, is disposed at one side of the container 10, and that member is secured to and supports a push rod 44. The push rod is held in register with an inclined surface 23 on lever 22 by the element 42. A compression spring 46 encircles the portion of rod 44 that extends to the left of element 42, and that spring biases rod 44 into engagement with inclined surface 23 on lever 22. An air-tight chamber 48 is provided at the left hand side of container 10; and that chamber and a duct, not shown, place element 42 in communication with the intake manifold of the engine. Although the spring 46 is strong enough to urge the push rod 44 against inclined surface 23 with sufficient force to rotate lever 22 to valve-opening position, the sizable difference between the pressures in container 10 and the intake manifold of the engine, at idling or moderate speeds of the engine, is great enough to overcome the force of spring 46 and hold push rod 44 out of engagement with lever 22. However, when the engine stops or approaches full throttle operation, the pressures in the intake manifold of the engine and in the chamber 48 will rise appreciably, whereupon the spring 46 will be able to overcome the pressures exerted on element 42 and push the rod 44 against the inclined surface 23 and thus rotate lever 22 to valve-opening position. Whenever the rod 44 is held out of engagement with lever 22 by element 42, the lever 22 can move to open and close the valve; but whenever rod 44 holds lever 22 in valve-opening position, the valve cannot close.

During normal running of the engine, the pressure differential on pressure-responsive element 42 will overcome the force of spring 46, and the movement of lever 22 will be controlled by pressure-responsive element 24. Spring 32 biases element 24 and lever 22 downwardly toward valve-opening position, but the pressure on the fuel within container 10 will urge element 24 and lever 22 upwardly toward valve-closing position. The amount of pressure which the fuel must exert upon element 24 to cause it to move upwardly will be determined by the setting of screw 34.

Fuel entering container 10 through opening 12 and valve seat 14 will substantially fill that container and the duct leading to the float valve of the carburetor, not shown. A small cushion of air will underlie element 24 whenever the pulsation dampener is in the position shown in the drawing. When the float valve of the carburetor closes, the pressure on the fuel within container 10 will begin to rise; and that pressure will be transmitted by the air cushion to the element 24. When that pressure reaches a predetermined value, the element 24 will flex upwardly and raise rod 28 and lever 22. The raising of lever 22 will force valve element 16 into engagement with the valve seat 14; thus preventing further influx of fuel into container 10.

Valve element 16 will continue to remain in engagement with valve seat 14, will continue to prevent further influx of fuel into container 10, and will thus limit the pressure on the fuel in container 10 until the float valve of the carburetor opens and reduces the pressure on the fuel within container 10 as by permitting part of that fuel to flow from container 10 to the float chamber of the carburetor. This flow will be in response to the pressure within the container 10 and not the fuel pump pressure, it will be substantially free from pulsations. When the pressure within the container 10 falls below a predetermined value, which value is determined by the setting of screw 34, the spring 32 will force element 24 and lever 22 downwardly; and thereafter the valve element 16 will be forced away from the valve seat 14 by the fuel in opening 12. The screw 34 will usually be set so the container 10 will be well below the fuel pump pressures, and thus the valve element 16 will laways be biased away from valve seat 14 by the pressure on the fuel attempting to enter container 10.

As fuel enters container 10, the pressure on the fuel in that container will again rise and enable element 24 to overcome the force of spring 32. In this way, element 24 and lever 22 will move up and down and cause selective closing and opening of the valve. The pressure-responsive element 24 will be made quite sensitive to pressure variations, and thus it will be able to hold the pressures on the fuel within container 10 between narrow limits. Moreover, in flexing under pressure, element 24 will absorb part of the pulsations, and the air cushion adjacent that element will absorb most of the rest of the pulsations. The pulsation dampener thus is able to deliver fuel to the carburetor that is under closely regulated pressure and is substantially free of pulsations.

The air cushion adjacent element 24 is very helpful, but it is not absolutely essential. In certain installations, because of space limitations, it has been necessary to operate the pulsation dampener in inverted position. When the pulsation dampener is in that position, the air will be displaced by fuel. While some pulsations will be noted in the pressure on the fuel supplied by the pulsation dampener when it is aspirated in inverted position, those pulsations will be of far smaller amplitude than those noted in the fuel supplied by the fuel pump.

When the engine is not operating or is approaching full throttle operation, the pressure differential on element 42 will decrease; and spring 46 will urge the push rod 44 against inclined surface 23 with sufficient force to rotate lever 22 to valve-opening position. The pressure on the fuel in opening 12 will then force valve element 16 away from valve seat 14 and permit unimpeded flow of fuel to the float chamber of the carburetor.

The pulsation-dampener of Fig. 2 is similar to the pulsation-dampener of Fig. 1; but it does not have the push rod 44, the pressure-responsive element 42, or the spring 46. Moreover, the lever of this pulsation dampener, which is denoted by the numeral 54, does not have an inclined surface similar to surface 23 of lever 22. The pulsation dampener of Fig. 2 operates in all other respects like the pulsation dampener of Fig. 1. The pulsation dampener of Fig. 2 can supply all of the fuel needed by most engines and can supply that fuel at sufficiently high rates to fully meet the needs of such engines. However, for some large displacement engines the pulsation dampener of Fig. 1 is better than the pulsation dampener of Fig. 2.

In Fig. 3 a push rod 58 is shown; and that push rod can be substituted for the push rod 44 of Fig. 1. The push rod 58 is supported by a flexible diaphragm 56, and that diaphragm will be supported in the manner of the pressure-responsive element 42 of Fig. 1. A washer 59 is locked onto the outer end of the push rod 58, and a compression spring 60 is disposed between the washer 59 and the bracket 61 that encircles push rod 58. The push rod will respond to the spring 60 and move to the left; the flexibility of diaphragm 56 permitting this movement. The outer end of the push rod 58 will be disposed adjacent a portion of the accelerator linkage, not shown, of the engine; and that linkage will strike the end of the push rod as the accelerator approaches open position, thus forcing the rod 58 to the right until it engages the inclined surface 23 on lever 22. The push rod 58 can thus move lever 22 to valve-opening position whenever the engine approaches full throttle operation.

In Fig. 4 a push rod 64 is shown; and that push rod is supported on a flexible diaphragm 62. Push rod 64 can be substituted for the push rod 44 of Fig. 1. A spring 66 bears against the flexible diaphragm 62 and against the interior of a bracket 67 on the container 10, and biases the push rod 64 and the flexible diaphragm 62 to the right. This biasing action of the spring 66 can urge the push rod 64 into engagement with the inclined surface 23 of lever 22 and thus hold that lever in valve-opening position; but the solenoid 68, mounted on bracket 67 and surrounding the outer end of push rod 64, normally holds push rod 64 out of engagement with lever 22. A switch, not shown, which is normally closed, but which can be opened when struck by a portion of the accelerator linkage or when the intake manifold pressure rises, will normally keep solenoid 68 energized. However, whenever the engine approaches full throttle operation, the switch will be opened to deenergize solenoid 68. Thereupon, spring 66 will move push rod 64 and force lever 22 to rotate to valve-opening position.

In Fig. 5, the numeral 70 denotes the liquid-tight container of a pulsation dampener which can be interposed between the fuel pump and carburetor of an engine. Fuel will enter this container through opening 12 and valve seat 14 whenever the valve element 16 is spaced below and out of engagement with that valve seat. A pivot 72 is supported on one wall of the container 70, and a float 74 rotates about that pivot. The pivot arm of the float 74 underlies the valve element 16, and it can move that valve element into engagement with the seat 14 whenever the float 74 rises above a predetermined level. An elongated leaf spring 76 is secured to the top of the float 74, and it extends across the container 70 as a cantilever. The free end of spring 76 underlies an adjustable screw 78. As the float 74 moves upwardly, and it will do so whenever container 70 is filled with fuel, the free end of spring 76 will engage the bottom of adjustable screw 78. The resilience of spring 76 will enable float 74 to continue to move upwardly for a short distance after that spring engages screw 78; such movement storing energy in spring 76. The float will continue to move upwardly until the valve element 16 is in contact with valve seat 14; and thereafter the valve will close. The valve will continue to remain closed until the float valve in the float chamber of the carburetor opens and permits fuel to flow from the container 70 to that float chamber. This flow will be under the influence of the energy stored within spring 76, and it will be smooth and substantially free from pulsations. The fuel will pass from container 70 to the float chamber of the carburetor through opening 38.

When the fuel level in container 70 falls to a predetermined level, the float 74 will be low enough that the valve element 16 can move out of engagement with valve seat 14; thus permitting additional fuel to enter container 70. The float 74 and spring 76 will thus regulate the introduction of fuel into the container 70.

An opening 88, with a very small orifice 90 adjacent thereto, is located at one side of the container 70 and is in communication with the intake of the fuel pump. The orifice 90 limits the rate of flow from container 70 to the intake of the fuel pump to such a small value that the container 70 can easily be kept filled with fuel. However, the orifice 90 will pass enough fuel to relieve the pressure on the bottom of valve element 16; thus facilitating certain and prompt opening of the valve when float 74 frees the valve element 16 for movement. The orifice 90 is desirable, but it is not absolutely essential.

A push rod 82 is disposed above the spring 76, and it is supported by the pressure-responsive element 80, shown as a diaphragm. The upper end of push rod 82 is surrounded by the helical spring 84, and the upper end of that spring bears against the interior of the airtight housing 85. An opening 86 in the housing 85 can be placed in communication with the intake manifold of the engine by a duct, not shown. When the engine is idling or is running at moderate speeds, the low pressures in the intake manifold will pull the pressure-responsive element 80 upwardly, and will pull the push rod 82 out of engagement with the leaf spring 76. However, when the engine is not operating, or when the engine approaches full throttle operation, the pressures in the intake manifold will rise, and the spring 84 will overcome the pressure differential on element 80 and force that element downwardly. Thereupon, the push rod 82 will engage the leaf spring 76 and force the float 74 downwardly so the valve element 16 can move out of engagement with the valve seat 14.

Under normal operating conditions of the engine, the float 74 will be free to move up and down to close and open the valve; but when the engine is at rest or is approaching full throttle operation, the float will be kept from closing the valve. The pressure-responsive element 80 performs the same function which the pressure-responsive element 42 of Fig. 1 performs.

Whereas several preferred forms of the present invention have been shown and described in the drawing and accompanying description, it should be apparent to those skilled in the art that various changes may be made in the form of the invention without affecting the scope thereof.

What I claim is:

1. A device that is adapted to receive fuel from the fuel pump of an engine and to direct said fuel toward the mixing jet of the carburetor of said engine while minimizing pulsations in the pressure and flow of said fuel and that comprises a liquid-tight container to receive and confine fuel, an inlet opening for said container, an outlet opening for said container, a valve seat and a movable valve element intermediate said inlet and outlet openings, said movable valve element being movable away from said valve seat to permit fuel to flow from said inlet opening to said outlet opening and being movable toward said valve seat to valve the flow of fuel from said inlet opening to said outlet opening, a fulcrum, a low weight and small mass lever that is movable about said fulcrum to move said movable valve element relative to said valve seat, a pressure-responsive element that is in communication with the interior of said container, a link that is mounted on and carried by said pressure-responsive element and that extends between said pressure-responsive element and said lever and is movable by said pressure-responsive element to move said lever and thereby move said movable valve element toward said valve seat, a spring that biases said pressure-responsive element and said link for movement to a position that permits said lever and said movable valve element to move away from said valve seat, said spring being yieldable to permit the pressure on fuel in said container to act upon said pressure-responsive element and move said pressure-responsive element and said link and thereby move said lever and said movable valve element toward said valve seat, a lost motion connection between said link and said lever that permits said pressure-responsive element and said link to move toward said position independently of said lever and said movable valve element, and a second spring that acts between said pressure-responsive element and said lever to normally take up the lost motion in said lost motion connection, said link acting upon said lever intermediate said fulcrum and said movable valve element to multiply the movement imparted to said movable element by said lever in response to movement of said pressure-responsive element and said link, the first said spring being at one face of said pressure-responsive element, said second spring being at the opposite face of said pressure-responsive element, said second spring being a helical compression spring, said second spring surrounding and having its axis parallel to said link, the first said spring being a helical compression spring, the first said spring and said second spring have their axes disposed in end to end alignment, the first said spring and the pressure on the fuel in said container maintaining said link and the portion of said pressure-responsive element engaged by said link in a floating position in said container whereby said pressure-responsive element and said link can move quickly when the pressure on said fuel falls, said pressure-responsive element being substantially completely under the control of the pressure on the fuel in said container and of the first said spring, whereby said device can be operated in any position.

2. A device that is adapted to receive fuel from the fuel pump of an engine and to direct said fuel toward the mixing jet of the carburetor of said engine while minimizing pulsations in the pressure and flow of said fuel and that comprises a liquid-tight container to receive and confine fuel, an inlet opening for said container, an outlet opening for said container, a valve seat and a movable valve element intermediate said inlet and outlet openings, said movable valve element being movable away from said valve seat to permit fuel to flow from said inlet opening to said outlet opening and being movable toward said valve seat to valve the flow of fuel from said inlet opening to said outlet opening, a fulcrum, a lever that is movable about said fulcrum to move said movable valve element relative to said valve seat, a pressure-responsive element that is in communication with the interior of said container, a link that is mounted on and carried by said pressure-responsive element and that extends between said pressure-responsive element and said lever and is movable by said pressure-responsive element to move said lever and thereby move said movable valve element toward said valve seat, a spring that biases said pressure-responsive element and said link for movement to a position that permits said lever and said movable valve element to move away from said valve seat, said spring being yieldable to permit the pressure on fuel in said container to act upon said pressure-responsive element and move said pressure-responsive element and said link and thereby move said lever and said movable valve element toward said valve seat, a lost motion connection between said link and said lever that permits said pressure-responsive element and said link to move toward said position independently of said lever and said movable valve element, and a second spring that acts between said pressure-responsive element and said lever to normally take up the lost motion in said lost motion connection, said link acting upon said lever intermediate said fulcrum and said movable valve element to multiply the movement imparted to said movable element by said lever in response to movement of said pressure-responsive element and said link, the first said spring being at one face of said pressure-responsive element, said second spring being at the opposite face of said pressure-responsive element, said second spring being a helical compression spring, the first said spring being a helical compression spring, the first said spring and the pressure on the fuel in said container maintaining said link and the portion of said pressure-responsive element engaged by said link in a floating position in said container whereby said pressure-responsive element and said link can move quickly when the pressure on said fuel falls, said pressure-responsive element being substantially completely under the control of the pressure on the fuel in said container and of the first said spring, whereby said device can be operated in any position.

3. A device that is adapted to receive fuel from the fuel pump of an engine and to direct said fuel toward the mixing jet of the carburetor of said engine while minimizing pulsations in the pressure and flow of said fuel and that comprises a liquid-tight container to receive and confine fuel, an inlet opening for said container, an outlet opening for said container, a valve seat and a movable valve element intermediate said inlet and outlet openings, said movable valve element being movable away from said valve seat to permit fuel to flow from said inlet opening to said outlet opening and being movable toward said valve seat to valve the flow of fuel from said inlet opening to said outlet opening, a fulcrum, a lever that is movable about said fulcrum to move said movable valve element relative to said valve seat, a pressure-responsive element that is in communication with the interior of said container, a link that is mounted on and carried by said pressure-responsive element and that extends between said pressure-responsive element and said lever and is movable by said pressure-responsive element to move said lever and thereby move said movable valve element toward said valve seat, a spring that biases said pressure-responsive element and said link for movement to a position that permits said lever and said movable valve element to move away from said valve seat, said spring being yieldable to permit the pressure on fuel in said container to act upon said pressure-responsive element and move said pressure-responsive element and said link and thereby move said lever and said movable valve element toward said valve seat, a lost motion connection between said link and said lever that permits said pressure-responsive element and said link to move toward said position independently of said lever and said movable valve element, and a second spring that acts between said pressure-responsive element and said lever to normally take up the lost motion in said lost motion connection, said link acting upon said lever intermediate said fulcrum and said movable valve element to multiply the movement imparted to said movable element by said lever in response to movement of said pressure-responsive element and said link, the first said spring being at one face of said pressure-responsive element, said second spring being at the opposite face of said pressure-responsive element, said pressure-responsive element being substantially completely under the control of the pressure on the fuel in said container and of the first said spring, whereby said device can be operated in any position.

4. A device that is adapted to receive fuel from the fuel pump of an engine and to direct said fuel toward the mixing jet of the carburetor of said engine while minimizing pulsations in the pressure and flow of said fuel and that comprises a liquid-tight container to receive and confine fuel, an inlet opening for said container, an outlet opening for said container, a valve seat and a movable valve element intermediate said inlet and outlet openings, said movable valve element being movable away from said valve seat to permit fuel to flow from said inlet opening to said outlet opening and being movable toward said valve seat to valve the flow of fuel from said inlet opening to said outlet opening, a fulcrum, a lever that is movable about said fulcrum to move said movable valve element relative to said valve seat, a pressure-responsive element that is in communication with the interior of said container, a link that extends between said pressure-responsive element and said lever and is movable by said pressure-responsive element to move said lever and thereby move said movable element toward said valve seat, a spring that biases said pressure-responsive element and said link for movement to a position that permits said lever and said movable valve element to move away from said valve seat, said spring being yieldable to permit the pressure on fuel in said container to act upon said pressure-responsive element and move said pressure-responsive element and said link and thereby move said lever and said movable valve element toward said valve seat, a lost motion connection between said link and said lever that permits said pressure-responsive element and said link to move toward said position independently of said lever and said movable valve element, and a second spring that acts between said pressure-responsive element and said lever to normally take up the lost motion in said lost motion connection, said link acting upon said lever intermediate said fulcrum and said movable valve element to multiply the movement imparted to said movable element by said lever in response to movement of said pressure-responsive element and said link, the first said spring being at one face of said pressure-responsive element, said second spring being at the opposite face of said pressure-responsive element.

5. A device that is adapted to receive fuel from the fuel pump of an engine and to direct said fuel toward the mixing jet of the carburetor of said engine while minimizing pulsations in the pressure and flow of said fuel and that comprises a liquid-tight container to receive and confine fuel, an inlet opening for said container, an outlet opening for said container, a valve seat and a movable valve element intermediate said inlet and outlet openings, said movable valve element being movable away from said valve seat to permit fuel to flow from said inlet opening to said outlet opening and being movable toward said valve seat to valve the flow of fuel from said inlet opening to said outlet opening, a fulcrum, a lever that is movable about said fulcrum to move said movable valve element relative to said valve seat, a pressure-responsive element that is in communication with the interior of said container, a link that extends between said pressure-responsive element and said lever and is movable by said pressure-responsive element to move said lever and thereby move said movable valve element, a spring that biases said pressure-responsive element and said link for movement to a position that permits said lever and said movable valve element to move away from said valve seat, said spring being yieldable to permit the pressure on fuel in said container to act upon said pressure-responsive element and move said pressure-responsive element and said link, a lost motion connection between said link and said lever that permits said pressure-responsive element and said link to move toward said position independently of said lever and said movable valve element, and a second spring that acts between said pressure-responsive element and said lever to normally take up the lost motion in said lost motion connection, said link acting upon said lever intermediate said fulcrum and said movable valve element to multiply the movement imparted to said movable element by said lever in response to movement of said pressure-responsive element and said link, the first said spring being at one face of said pressure-responsive element, said second spring being at the opposite face of said pressure-responsive element, said pressure-responsive element being substantially completely under the control of the pressure on the fuel in said container and of the first said spring, whereby said device can be operated in any position.

References Cited in the file of this patent

UNITED STATES PATENTS

| | | |
|---|---|---|
| 329,928 | Merrill | Nov. 10, 1885 |
| 744,297 | Cook | Nov. 17, 1903 |
| 825,559 | Schrader | July 10, 1906 |
| 1,611,263 | Bihl | Dec. 21, 1926 |
| 1,890,821 | Meyer | Dec. 13, 1932 |
| 1,931,386 | Hughes | Oct. 17, 1933 |

FOREIGN PATENTS

| | | |
|---|---|---|
| 616,458 | Germany | July 29, 1935 |
| 870,918 | France | Mar. 30, 1943 |